UNITED STATES PATENT OFFICE.

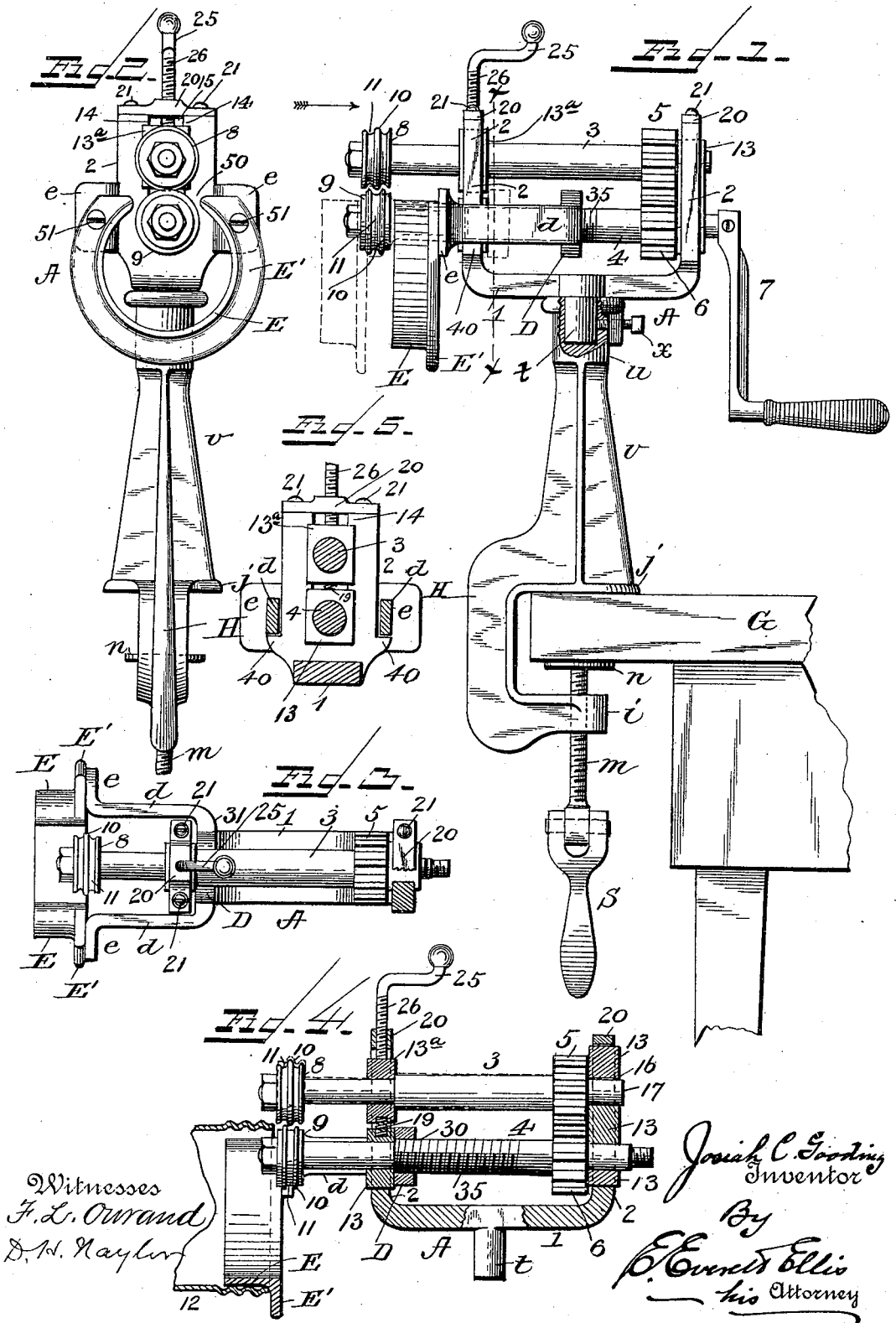

JOSIAH C. GOODING, OF COVINGTON, INDIANA.

MACHINE FOR GROOVING OR THREADING SHEET-METAL PIPE-SECTIONS.

SPECIFICATION forming part of Letters Patent No. 616,783, dated December 27, 1898.

Application filed September 28, 1898. Serial No. 692,084. (No model.)

*To all whom it may concern:*

Be it known that I, JOSIAH C. GOODING, a citizen of the United States, residing at Covington, in the county of Fountain and State of Indiana, have invented certain new and useful Improvements in Machines for Grooving or Threading Sheet-Metal Pipe-Sections; and I do hereby declare the following to be a full, clear, and exact description of the invention, such as will enable others skilled in the art to which it appertains to make and use the same.

This invention relates to certain new and useful improvements in machines for threading or grooving sheet-metal pipe-sections; and it consists, substantially, in such features of construction, arrangement, and combinations of parts as will hereinafter be more particularly described.

The invention has for its object to provide a machine of this character which is cheap and simple in operation and one that is thoroughly effective in the performance of the work intended for it to do.

A further object is to provide such a machine with means readily adapting it for the reception of the work to be operated upon, and also to provide means for increasing or diminishing at will the friction or pressure of the threading or forming rolls upon the work.

A further object is to provide a uniform or regular feed for the pipe-sections while operated upon by the threading-rolls and to provide for the ready and quick removal of the work from the machine when finished.

A still further object is to provide a convenient and effective support for the machine upon a work bench or table, and also to provide for the quick and ready removal and replacement of the shafts and bearings for the shafts of the threading-rolls.

The above and additional objects I attain by the means illustrated in the accompanying drawings, in which—

Figure 1 is a side elevation, partly broken away, of a machine constructed and arranged in accordance with my invention, the machine being shown as supported upon a work bench or table by means of a clamp preferably employed for that purpose. Fig. 2 is an end elevation looking in the direction of the arrow, Fig. 1, the tightening or adjusting screw for the clamp being broken off. Fig. 3 is a top or plan view with the operating crank or handle for the shafts removed. Fig. 4 is a longitudinal sectional view of the machine in part elevation and detached from the support or clamp, the said view indicating in dotted lines the elevated position of the upper threading-roll to enable the ready insertion of the end of a pipe-section in place upon the holder therefor. Fig. 5 is a detail view in section on line $xx$, Fig. 1, to show more clearly the means for guiding the movable carriage which supports the holder for the pipe-section.

Preliminarily to a more detailed description it may be stated that my invention comprises a machine that is hand-operated and one also that is portable, and while the machine can be mounted directly upon a work bench or table I prefer the use of a support therefor, comprising a clamp or similar device for attachment to a work bench or table. The machine itself comprises a pair of grooving or threading rolls carried by shafts or spindles properly geared together by which to revolve in opposite directions, and one of said shafts constitutes a feed for a carriage, which supports a holder for the pipe-section to be operated upon. The said carriage moves or travels relative to said shaft or feed, and the construction is thus distinguished from a traveling screw or screws supporting a holder for the end of the pipe-section operated upon. The holder as constructed and arranged by me prevents any undue distortion or bending of the pipe-section while being operated upon by the threading-rolls, and said holder is detachable from the carriage to permit different sizes thereof to be used for pipe-sections of different diameters. The bearings for the roll shafts or spindles are removable and are readily replaced by others when worn.

In the accompanying drawings, A represents my improved machine for threading or grooving sheet-metal pipe-sections, the same comprising a stationary yoke or frame 1, having end pieces or sections 2 2, in which are supported in suitable bearings the shafts or spindles 3 4, which are provided with the intermeshing gear-wheels 5 and 6, by which when the shaft 4, for instance, is turned by means of the handle or crank 7 the said shafts or spindles are caused to revolve in opposite directions. Said shafts or spindles extend somewhat beyond the frame 1 at one end, and at such end they are provided with the grooving or threading rolls 8 9, which are formed, as usual, with the circumferential beads 10 and grooves 11, by which to provide the desired thread or groove in the pipe-section 12, Fig. 4, when the latter is placed between the two rolls in the manner to be described. The bearings for each of the said shafts 3 4 consists of brass block pieces or sections 13 and 13ª, properly shaped to receive the shafts, and said blocks or sections are also shaped to fit in grooves formed in the sides 14 14 of the recesses 15, formed in the end pieces or sections 2 2 of the frame 1. On account of this construction the bearings and shafts can be readily removed when desired. As shown at 16, Fig. 4, the end 17 of the shaft 3 has a slight play in its bearing, and the opposite bearing 13ª for said shaft is acted upon by a spring 19, properly seated between this bearing and the bearing 13 beneath it, so that the said shaft 3 is normally somewhat elevated from shaft 4 at the projecting end thereof, and in this way the threading-rolls 8 and 9 are separated and held apart a suitable distance to admit of the insertion between them of the end of the pipe-section 12 to be operated upon. The tops of the end sections 2 2 of the frame are provided with cap-pieces 20, secured in place by screws 21, and these cap-pieces serve to keep the bearings or boxes 13 13ª in place.

In order to depress the shaft 3 and its roll, so as to cause the two rolls to exert the desired friction and pressure upon the pipe-section, I employ any suitable means, preferably in the shape of a crank 25, having a threaded portion 26 screwing into an opening in the cap-piece 20 above the bearing 13ª and pressing upon the upper surface of the latter, so as to force it and the shaft downwardly against the action of spring 19 whenever the crank is turned in the proper direction. To remove the finished pipe-section, it is simply necessary to unscrew the crank, when the roll will be forced upward by the spring, as before.

It may be stated that the machine is intended more particularly for grooving or threading stovepipe-sections for a suitable distance from the ends thereof, and it is of course necessary to provide a proper feed for the sections, due to the fact that the plane of rotation of the threading-rolls is always the same. I have therefore devised a movable carriage D, having two arms or branches $d$ $d$, which are bent or turned at the ends to form lugs or ears $e$ $e$ for the attachment thereto of the holder E for the pipe-sections. Said carriage is formed with a left-hand threaded opening 30 at the central part of its connecting portion 31, and the shaft or spindle 4 is formed with a left-hand screw-thread 35 passing through and fitting said opening, so that as the shaft is revolved in the right-hand direction the carriage is fed outwardly, and then when the movement of the shaft is reversed the carriage is of course carried back or inwardly. In order to support and guide the said carriage in true parallelism, suitable guides are provided in the shape of lugs 40, projecting from the sides of that one of the end sections 2 of the frame 1 which is within or between the branches $d$ $d$ of said carriage during the movements of the latter. It is of course apparent that other means could be employed for guiding the said carriage.

The pipe-holder E consists of a ring of metal having a section or segment removed or cut out at 50, so as to permit the pipe to be grasped between the rolls 8 and 9, and said ring is provided with a flange E′, similarly cut out, which flange serves as a means of attaching the holder to the carriage D by the use of screws 51, passing through the lugs or ears $e$ $e$ on said carriage. Said flange E′ is also an abutment for the end of the pipe-section and serves to receive the back thrust thereof during the operation of threading the pipe between the rolls.

In use the machine is preferably supported upon a work bench or table G by means of a clamp H, having two jaws $i$ and $j$, with a screw $m$ working in the latter and provided at its upper end with a bearing-plate $n$ for pressing against the under side of said table when the screw is tightened. The lower end of the screw is permanently provided with a pivoted handle or wrench S for enabling the proper turning of said screw to be conveniently effected at all times. The machine is provided on its under side with a stub-pin $t$, fitting in a socket $u$ in the upper end of the upright $v$ of the clamp, and a set-screw $x$ is used to tighten the said machine in whatever position it may be turned.

It will be understood, of course, that I am not limited to the precise details of construction and arrangement of parts herein shown and described.

What I claim is—

1. A machine for threading or grooving sheet-metal pipe-sections, the same comprising a pair of grooving or threading rolls operating constantly in the same plane, a holder for a pipe-section consisting of a flanged ring with a segment cut out to admit the rolls, and a feed for said holder.

2. A machine for threading or grooving sheet-metal pipe-sections, the same comprising a pair of grooving or threading rolls operating constantly in the same plane, a holder for a pipe-section, consisting of a flanged ring with a segment removed to admit the rolls, and a feed for said holder also operating constantly in the same plane.

3. A machine for threading or grooving sheet-metal pipe-sections, the same comprising a pair of grooving or threading rolls operating constantly in the same plane, a carriage movable at right angles to the working faces of the rolls, a holder for a pipe-section detachably connected to the carriage, and comprising a flanged ring with a segment removed to admit the rolls, and a feed for the carriage also constantly operating in the same plane.

4. A machine for threading or grooving sheet-metal pipe-sections, the same comprising a pair of shafts each carrying a grooving or threading roll, and both constantly operating in the same plane, means between the shafts tending to separate the rolls, means for pressing the rolls together at will, a holder for a pipe-section, and means on one of the shafts for feeding said holder at right angles to the working faces of the rolls.

5. A machine for threading or grooving sheet-metal pipe-sections, the same comprising a pair of shafts constantly operating in the same plane, one shaft having a feed-screw thereon, and each shaft carrying a grooving or threading roll, a carriage threaded to receive said screw, and moving at right angles to the working faces of the rolls, and a holder for a pipe-section detachably connected to said carriage.

6. The combination with a machine for threading or grooving sheet-metal pipe-sections, of a support therefor consisting of an upright or standard provided with means for clamping or attaching to a table or bench.

7. A machine for threading or grooving sheet-metal pipe-sections, the same comprising a pair of shafts constantly operating in the same plane, one shaft having a feed-screw thereon, and each shaft carrying a grooving or threading roll, a movable carriage threaded to receive said screw and formed with the arms or branches having the lugs or ears at the ends thereof, and a holder for a pipe-section detachably fastened to said lugs or ears.

In testimony whereof I affix my signature in presence of two witnesses.

JOSIAH C. GOODING.

Witnesses:
 E. W. HEATH,
 J. W. LEWIS.